United States Patent Office 2,930,773
Patented Mar. 29, 1960

2,930,773

NOVEL COMPOSITION AND METHOD OF CURING EPOXY RESINS

Malcolm M. Renfrew, Snyder, N.Y., and Dwight E. Peerman, Minneapolis, Minn., assignors to General Mills, Inc., a corporation of Delaware No Drawing. Application January 30, 1956
Serial No. 561,990

6 Claims. (Cl. 260—18)

This invention relates to novel compositions of polyamides, aromatic diamines, and epoxy resins and the method of curing these compositions to produce resins having many new and unexpected characteristics. Furthermore, the compositions of this invention are more easily and safely handled than similar known compositions.

It is well known that polyamides prepared from polymeric fat acids and aliphatic amines are effective curing agents for glycidyl polyethers, commonly called epoxy resins. Renfrew and Wittcoff, Patent 2,705,223, discloses their use in this manner.

Various amines and diamines have also been proposed as curing agents for epoxy resins. The use of aromatic diamines has, heretofore, presented many difficulties and hazards. For instance, when epoxy resins are cured with aromatic diamines the resulting products are extremely friable and brittle. Generally speaking, these are undesirable characteristics in the usual applications of this type of resin. Another disadvantage to the use of aromatic diamines is their toxicity. This presents a serious handling problem and numerous cases of dermatitis have resulted from direct contact with the aromatic diamines. Even more alarming are the toxic fumes, which also cause dermatitis, necessarily given off when the aromatic diamines are employed by themselves to cure the epoxy resins. These fumes result from heating of the aromatic diamine and epoxy resin mixtures which is an essential step in their preparation since the aromatic diamines are solids at room temperature. As a consequence the extra facilities and precautions which must be employed by the ultimate user are disadvantageous to the extent that they preclude broad acceptance of the aromatic diamines as curing agents for epoxy resins.

It has now been discovered that mixtures of polyamides and aromatic diamines may be prepared which retain the desirable characteristics of each, overcome the above-mentioned disadvantages, and have new and novel characteristics of their own.

An object of this invention is to disclose new and novel compositions which may be used to prepare resins of high impact resistance, machinability, high heat resistance, and great stability at elevated temperatures.

Another object is to disclose a new method of curing epoxy resins.

A further object is to disclose compositions containing aromatic diamines which may be mixed and heated with epoxy resins at elevated temperatures such that toxic fumes are not given off.

Other objects and advantages of this invention will become apparent in the subsequent description in the specification.

Polyamides employed in this invention are, in general, those prepared from polymeric fat acids and aliphatic polybasic amines and are readily available commercially. This type of polyamide is disclosed in Bradley Patent 2,379,413 and Cowan et al. Patent 2,450,940. The preferred polyamides are those having an amine number in the range of 75 to 350.

Polymeric fat acids are prepared by polymerizing long-chain unsaturated aliphatic acids. The most common unsaturated fatty acids are oleic, linoleic, linolenic, eladic and ricinoleic acids. These acids and mixtures thereof may be obtained from a wide variety of vegetable and animal oils. Illustrative are tallow, greases, soybean, linseed, tung, perilla, cottonseed, corn, tall, sunflower, safflower, castor and other similar oils. In the polymerization process for the preparation of the polymeric fat acids, the fatty acids with sufficient double bond functionality combine for the most part, probably by Diels-Alder mechanism, to provide a mixture of dibasic and higher polymeric acids. The acids with insufficient functionality to react remain as monomers and may be wholly or partially removed, such as by distillation. Thus, the term "polymeric fat acid" as used herein is intended to include the polymerized mixture of acids obtained, which mixture contains a predominant portion of dimeric acids, a smaller amount of trimeric and higher polymeric acids, and some residual monomer.

Aliphatic polybasic amines which may be used to react with the polymeric fat acids to form the polyamides have the following structural formula,

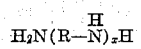

where R is an alkylene radical and $x$ is an integer less than 6. Typical of the polybasicamines that may be used are ethylene diamine, diethylene triamine, triethylene tetramine, tetraethylene pentamine, 1,4-diaminobutane, 1,3-diaminobutane, hexamethylene diamine, 3-(N-isopropylamino)propylamine, 3,3'-imino-bispropylamine, and the like.

Aromatic diamines which may be mixed with the above-described polyamides have the following structural formula $H_2NR'NH_2$ where R' is an arylene radical containing at least one and less than five aromatic nuclei and preferably less than 3. Illustrative aromatic diamines are metaphenylene diamine, p,p'-methylene dianiline, paraphenylene diamine, and 1,4-aminonaphthalene.

Blends of the polyamides and aromatic diamines are prepared by heating them to 80–100° C. Although some toxic fumes are given off at these temperatures, it is readily apparent that this does not present the same serious problem as in the case of the epoxy resin and aromatic diamine blends. For instance, the polyamide and aromatic diamine can be blended at the time of packaging and then shipped to the user who is no longer confronted with the problem of toxic fumes. Likewise, the packaging can be carried out by skilled workers under ideal conditions which could not be duplicated by each individual user.

Another element of the invention is that the polyamide serves as a vehicle for the aromatic diamine. Thus, the polyamide has a solubilizing effect on the aromatic diamines. It was also noted in instances where more than one aromatic diamine was employed that the viscosity of the final blend is frequently lower than the viscosity of the polyamide itself. In certain applications this is an important factor since the polyamide employed may be too viscous for effective mixing with the epoxy resin. Or the epoxy resinous compositions themselves may be highly viscous. Likewise, it is possible that the solubilizing effect of the polyamides on the aromatic diamines may be the reason for the elimination of toxic fumes.

The mixtures of aromatic diamines and polyamides constitute a 100% curing agent for the epoxy resins, i.e., no solvent or other carrier is necessary. The relative proportions of each may be varied depending upon the characteristics desired in the final cured epoxy resin.

Blends containing 2 to 50% aromatic diamine and from 50 to 98% polyamide may be employed. It is preferred, however, to use from 3 to 25% aromatic diamine.

The epoxy resins employed in this invention are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily avlia able commercial products.

Typical polyhdric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis(p-hydroxy phenyl)propane (Bisphenol A), and the resin having the following theoretical structural formula,

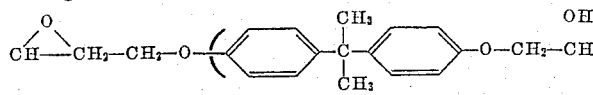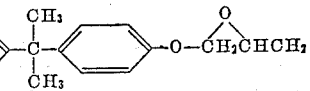

where $n$ is 0 or an integer up to 10. Generally speaking, $n$ will be no greater than 2 or 3 and is preferably 1 or less.

Epoxy resins may be characterized further by reference to their epoxy equivalent weight the epoxy equivalent weight of pure epoxy resins being the mean molecular weight of the resin divided by the mean number of epoxy radicals per molecule, or in any case the number of grams of epoxy resin equivalent to one mole of the epoxy group or one gram-equivalent of epoxide.

Epoxy resinous compositions encompassed by this invention are those having an epoxy equivalent weight of 125 to 400, the preferred epoxy equivalent weight being 150 to 250, expressed in terms of grams of compound per epoxy group.

Generally speaking, the amount of aromatic diamine and polyamide blend to be mixed with epoxy resin should be such that the combined amino and amide content is approximately equal mole for mole to the epoxide content of the epoxy resin. However, excesses of either up to 25% on an equivalency basis will still give the beneficial results of this invention.

The following examples will further illustrate this invention. All "parts" are expressed as parts by weight.

*Example 1*

Twelve parts of metaphenylene diamine were blended at 150° C. with 20 parts of a polyamide, prepared by reacting 3 parts of a dimerized fatty acid with 1 part triethylene tetramine. After cooling this mixture was blended with 100 parts of an epoxy resinous composition prepared by reacting 2,2-bis(p-hydroxy phenyl) propane (Bisphenol A) and epichlorohydrin (Epon 828) having an epoxy equivalent weight of 200. This mixture was cured for 4 hours at 150° C. The resulting product had a Barcol hardness of 80 and a heat distortion temperature of 120° C.

*Example 2*

3.8 parts of metaphenylenediamine were blended at 150° C. with 50 parts of a polyamide prepared by reacting 3 parts of a dimerized fatty acid with 1 part triethylene tetramine. After cooling this mixture was blended with 100 parts of an epoxy resinous composition prepared by reacting 2,2-bis(p-hydroxy phenyl)propane (Bisphenol A) and epichlorohydrin (Epon 828) having an epoxy equivalent weight of 200. The resulting product after curing for 4 hours at 150° C. had a Barcol hardness of 72 and a heat distortion temperature of 98° C.

*Example 3*

Twelve parts of a p,p′-methylene dianiline were blended at 140° C. with 30 parts of a polyamide prepared by reacting 3 parts of a dimerized fatty acid with 1 part triethylene tetramine. After cooling the above blend was mixed with 70 parts of an epoxy resinous composition prepared by reacting 2,2-bis(p-hydroxy phenyl) propane (Bisphenol A) and epichlorohydrin having an epoxy equivalent weight of 200. This mixture was then cured for 4 hours at 150° C. The resulting product had a Barcol hardness of 70 and a heat distortion temperature of 87° C.

The polyamide, aromatic diamine, and epoxy resin are useful as molding, casting, and laminating resins. Upon curing they demonstrated a remarkable high distortion temperature. This characteristic makes them especially useful for the insulation and potting of electrical equipment and apparatus. Other uses and modifications for the compositions of this invention as hereinbefore set forth will become apparent without departing from the scope and spirit thereof.

Now, therefore, we claim:

1. Method for curing glycidyl polyethers of 2,2-bis (p-hydroxy phenyl) propane having an epoxy equivalent weight of 125 to 400 which comprises reacting said glycidyl polyethers with a mixture composed of from 2 to 50% of aromatic diamines having the structural formula $H_2NR'NH_2$ where $R'$ is an arylene radical having from 1 to 5 aromatic nuclei and from 50 to 98% of polyamides, said polyamides being the reaction product of polymeric fat acids and aliphatic amines having the structural formula $H_2N(RNH)_xH$ where $R$ is an alkylene radical and $x$ is an integer of from 1 to 5.

2. The method of claim 1 in which the glycidyl ether has an epoxy equivalent weight of 150 to 250.

3. A cured composition of matter comprising a blend of a glycidyl polyether of 2,2-bis(p-hydroxy phenyl) propane having an epoxy equivalent weight of 125 to 400 with from 2 to 50% of aromatic diamine having the structural formula $H_2NR'NH_2$ where $R'$ is an arylene radical having from 1 to 5 aromatic nuclei and from 50 to 98% of a polyamide which is the reaction product of polymeric fat acids and aliphatic amines having the structural formula $H_2N(RNH)_xH$ where $R$ is an alkylene radical and $x$ is an integer from 1 to 5.

4. Composition of claim 3 in which the glycidyl ether has an epoxy equivalent weight of 150 to 250.

5. A method as defined in claim 1 in which said aromatic diamine is employed in an amount of from 3 to 25%.

6. A composition of matter as defined in claim 3 in which said aromatic diamine consists of from 3 to 25% of said blend.

References Cited in the file of this patent

UNITED STATES PATENTS 2,705,223    Renfrew et al.    Mar. 29, 1955
2,801,229    De Hoff et al.    July 30, 1957

OTHER REFERENCES

Northwestern Club, Paint, Oil and Chemical Preview, November 5, 1953, pp. 72–80. (Copy in Scientific Library.)

Marmion: "Epoxide Resins," Research (London), vol. 7, pages 351–355, 1954. (Copy in Div. 50.)

Charlton: "Alloying with Epoxies," Modern Plastics, vol. 32, No. 1, pages 155–157. (Copy in Div. 50.)